(12) United States Patent
Tejada et al.

(10) Patent No.: US 8,189,079 B2
(45) Date of Patent: May 29, 2012

(54) IMAGING APPARATUS AND METHOD

(75) Inventors: Jose Tejada, Valencia (ES); Rafael Dominguez-Castro, Seville (ES); Fernando Medeiro, Seville (ES); Francisco J. Jimenez, Seville (ES)

(73) Assignee: Texas Instruments Incorporated, Dallas, TX (US)

( * ) Notice: Subject to any disclaimer, the term of this patent is extended or adjusted under 35 U.S.C. 154(b) by 377 days.

(21) Appl. No.: 12/533,222

(22) Filed: Jul. 31, 2009

(65) Prior Publication Data

US 2010/0039544 A1 Feb. 18, 2010

(30) Foreign Application Priority Data

Aug. 1, 2008 (JP) .................... 2008-199886

(51) Int. Cl.
*H04N 5/20* (2006.01)
*H04N 5/235* (2006.01)

(52) U.S. Cl. ............... 348/255; 348/229.1; 348/230.1; 348/302; 348/294

(58) Field of Classification Search ............... 348/300, 348/229.1, 255, 230.1, 294
See application file for complete search history.

(56) References Cited

U.S. PATENT DOCUMENTS

| | | | |
|---|---|---|---|
| 2004/0179118 A1* | 9/2004 | Itani | 348/255 |
| 2007/0159540 A1* | 7/2007 | Imaizumi et al. | 348/255 |
| 2008/0316347 A1* | 12/2008 | Gamal et al. | 348/296 |

* cited by examiner

*Primary Examiner* — Sinh Tran
*Assistant Examiner* — Shahbaz Nazrul
(74) *Attorney, Agent, or Firm* — John J. Patti; Wade J. Brady, III; Frederick J. Telecky, Jr.

(57) ABSTRACT

In recent years, the performance of CMOS and CCD image sensors has dramatically improved, and to utilize the improved performance of these sensors, processing circuitry is provided here. This processing circuitry employs a adjustable gain that varies depending on the intensity of the signal from the image sensor so as to reduce noise, reduce area used, and reduce power consumption.

6 Claims, 7 Drawing Sheets

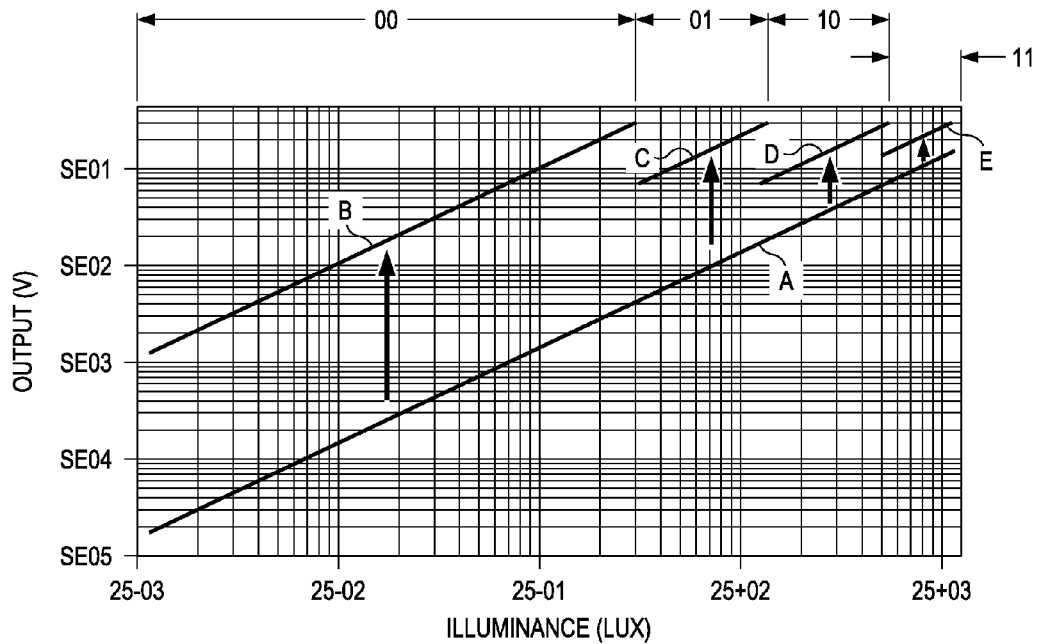
FIG. 4
FIG. 5A
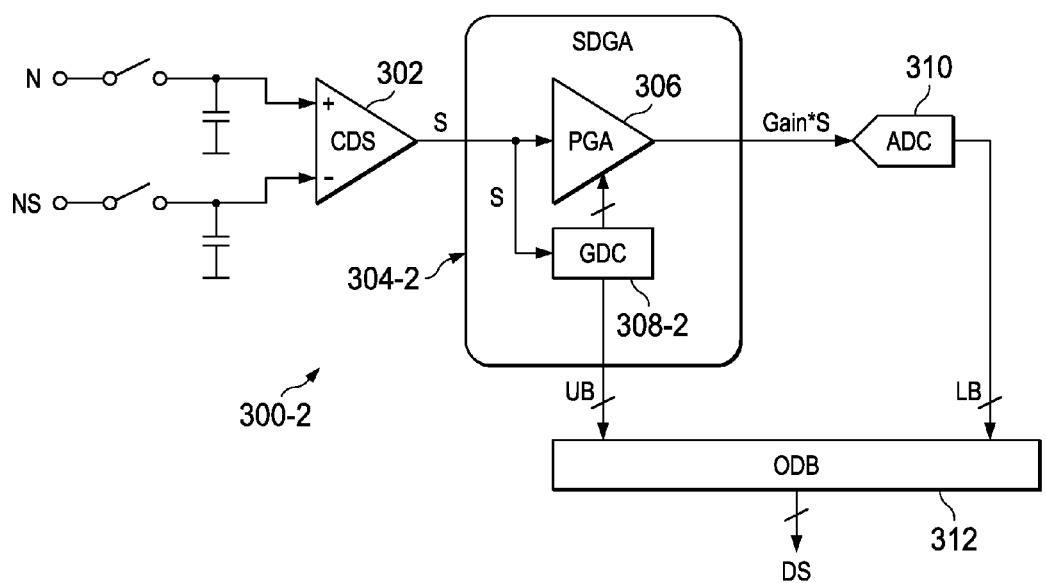

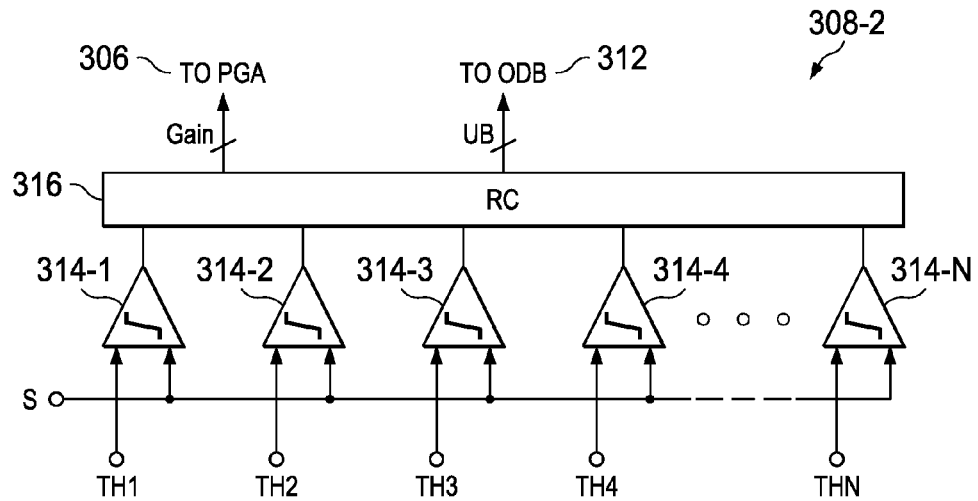
FIG. 5B
FIG. 6A
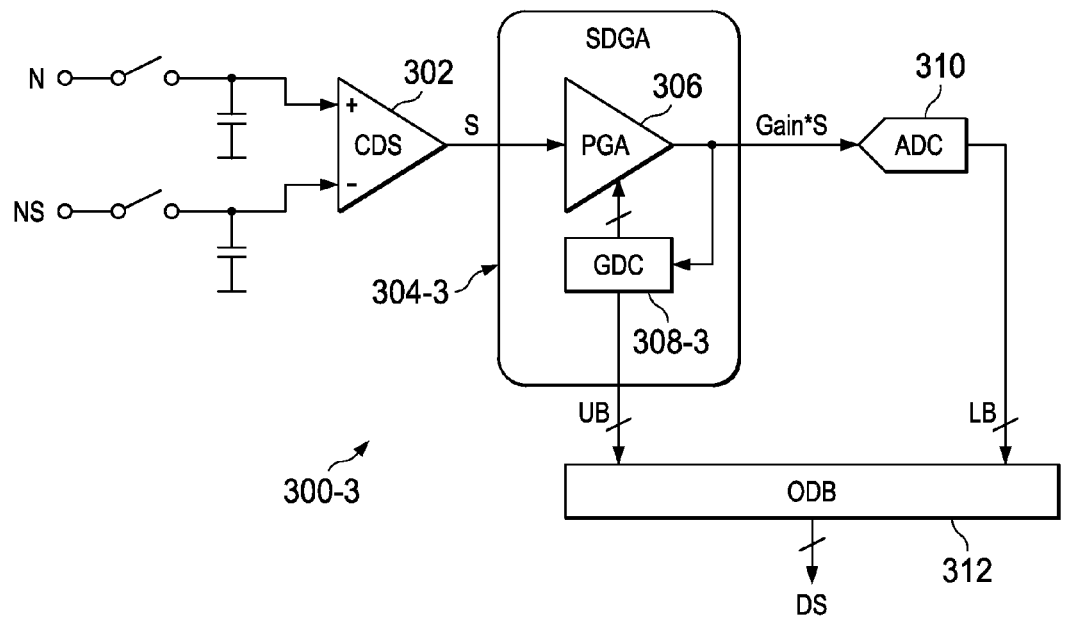

IMAGING APPARATUS AND METHOD

CROSS-REFERENCE TO RELATED APPLICATIONS

This patent application claims priority from Japanese Patent Application No. 2008-199886, filed 1 Aug. 2008 the entirety of which is incorporated herein by reference.

TECHNICAL FIELD

The invention relates generally to an imaging apparatus and, more particularly, to a analog-to-digital converter (ADC) for a CMOS sensor or CCD sensor.

BACKGROUND

In recent years, the characteristics and performance of CMOS image sensors and Charge Coupled Device (CCD) image sensors, among others, have improved, and demand for these image sensors has grown accordingly. Turning to FIG. 1, a conventional CMOS image sensor 100 can be seen. The CMOS sensor 100 generally comprises an array 102 of pixels 106-11 through 106-MN and interface circuitry 104. The interface circuitry 104 can then generate output signals N and NS. Generally, these signals N and NS are processed by circuitry to generate digital signals.

An example of a conventional processing circuit can be seen in FIG. 2. Circuit 200 signals N and NS from pixels 106 (which can be any of pixels 106-11 to 106-MN and which are read sequentially or in parallel). An summing circuit 202 calculates the difference between signals NS and S to generate an analog signal S in a so-called a correlated double sampling (CDS) circuit. Signal S is input to analog-to-digital converter (ADC) 204 and converted into digital signal DS. However, circuit 200 has undesirable noise characteristics.

SUMMARY

In accordance with a preferred embodiment of the present invention, an apparatus is provided. The apparatus comprises a plurality of pixel elements arranged into an array; interface circuitry that is coupled to each of the pixel elements; a correlated double sampling (CDS) circuit that is coupled to the interface circuit and that generates an analog signal; a signal-dependent gain amplifier (SDGA) that is coupled to the CDS circuit, wherein SDGA includes: a programmable gain amplifier (PGA) that receives the analog signal and has an adjustable gain; and a gain-setting circuit (GDC) that segments the analog input signal into a plurality of regions, that outputs a first digital signal, and that adjusts the adjustable gain based at least in part on the segmentation of the analog signal, wherein each region is associated with an intensity range; and an analog-to-digital converter (ADC) that is coupled to the signal SDGA so as to generate a second digital signal; and an output data building (ODB) circuit that is coupled to each of the SDGA and the ADC so as to generate a third digital signal from the first and second digital signals.

In accordance with a preferred embodiment of the present invention, the GDC further comprises: a plurality of comparator, wherein each comparator is coupled to the CDS circuit, and wherein each comparator compares the analog signal to one of a plurality of threshold voltages; and a region coding circuit that is coupled to each of the comparators, the PGA, and the ODB circuit.

In accordance with a preferred embodiment of the present invention, the GDC receives the analog signal.

In accordance with a preferred embodiment of the present invention, the GDC receives the output of the PGA and iteratively adjusts the adjustable gain of the PGA until the output of the PGA exceeds a predetermined threshold.

In accordance with a preferred embodiment of the present invention, an apparatus is provided. The apparatus comprises a plurality of pixel elements arranged into an array; interface circuitry that is coupled to each of the pixel elements; an input stage including: a plurality of buffers that are each coupled to the interface circuitry; an integrator that is coupled to each of the buffers, wherein the integrator outputs has an adjustable gain; a comparator that is coupled to the integrator and that compares the analog signal to a threshold voltage; a coding circuit that is coupled to the comparator and the integrator and that generates a first digital signal, wherein the coding circuit increases the adjustable gain until the analog signal is greater than the threshold voltage; an ADC that is coupled to the integrator so as to generate a second digital signal; and an ODB circuit that is coupled to each of the coding circuit and the ADC so as to generate a third digital signal from the first and second digital signals.

In accordance with a preferred embodiment of the present invention, the integrator further comprises: a first switch; a first capacitor that is coupled between the first switch and ground; a second switch that is coupled to the first capacitor; a differential amplifier having a first input terminal, a second input terminal, and an output terminal, wherein the first input terminal is coupled to ground, and wherein the second input terminal is coupled to the second switch; and a second capacitor that is coupled between the output terminal and the second input terminal.

In accordance with a preferred embodiment of the present invention, the ADC further comprises: a second comparator that is coupled to the integrator; a digital ramp signal generator; and a digital register that is coupled to the second comparator, the digital ramp signal generator, and the ODB circuit.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 is a graph depicting the operation of the circuitry of FIG. 3;

FIGS. 5A and 5B are an example of processing circuitry for the CMOS sensor of FIG. 1 in accordance with a preferred embodiment of the present invention;

FIGS. 6A and 6B are an example of processing circuitry for the CMOS sensor of FIG. 1 in accordance with a preferred embodiment of the present invention;

DETAILED DESCRIPTION

Figure 1:
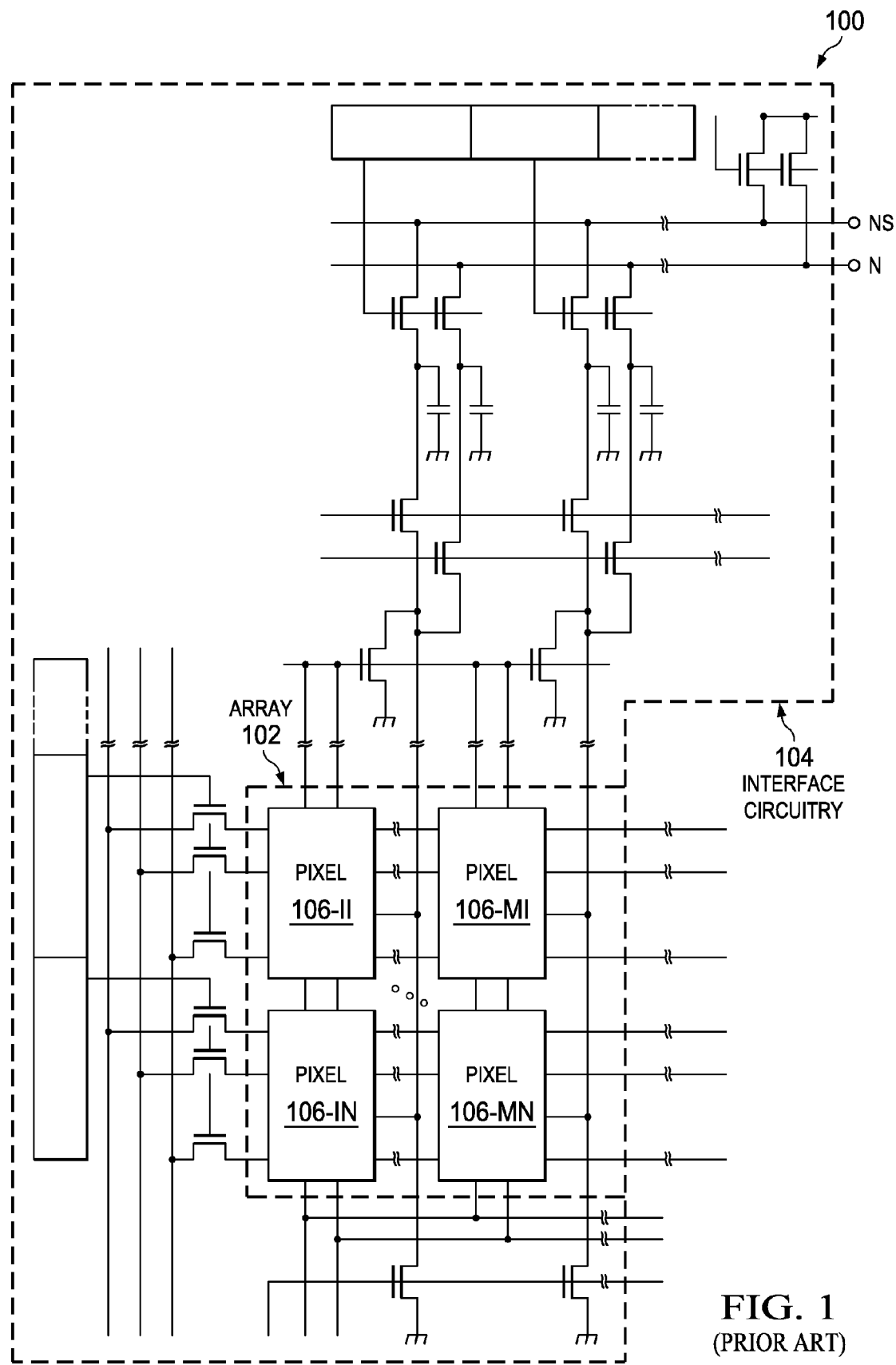
FIG. 1 is a circuit diagram showing an example of a conventional CMOS image sensor.
Figure 2:
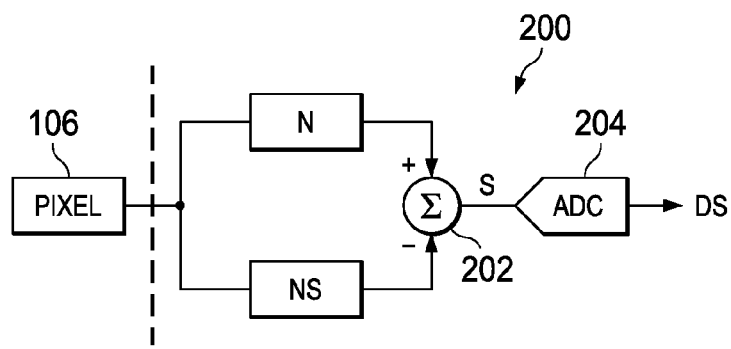
FIG. 2 is a circuit diagram showing an example of processing circuitry for the CMOS sensor of FIG. 1.

Refer now to the drawings wherein depicted elements are, for the sake of clarity, not necessarily shown to scale and wherein like or similar elements are designated by the same reference numeral through the several views.

Figure 3:
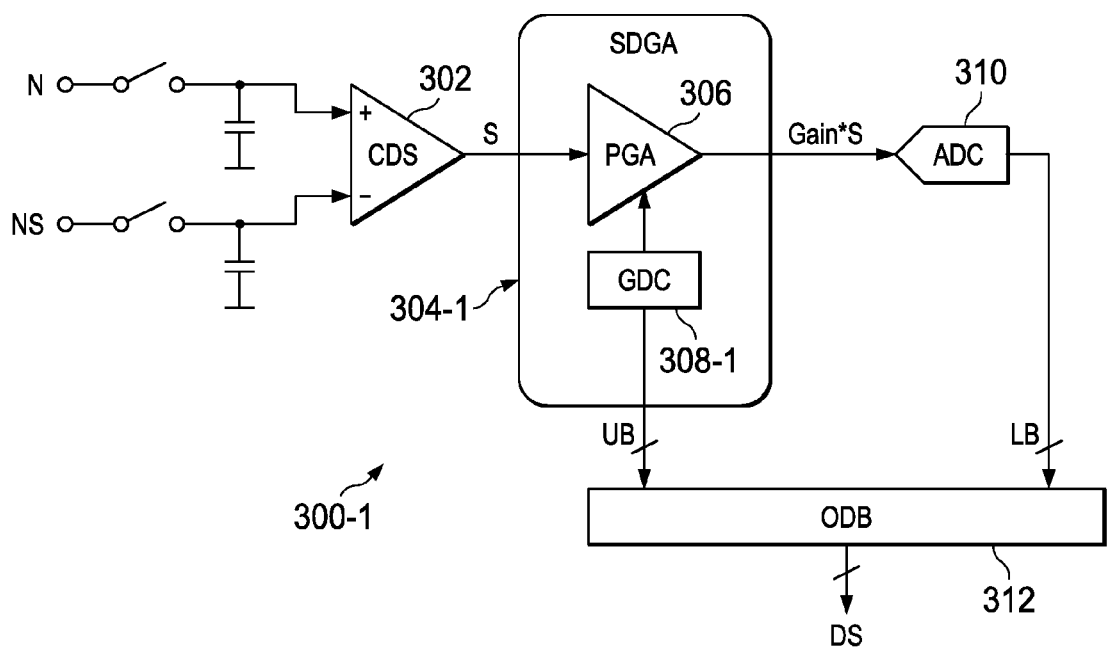
FIG. 3 is an example of processing circuitry for the CMOS sensor of FIG. 1 in accordance with a preferred embodiment of the present invention.

Referring to FIG. 3 of the drawings, the reference numeral 300-1 generally designates a processing circuitry in accordance with a preferred embodiment of the present invention. Circuit 300-1 generally comprises a correlated double sampling (CDS) circuit 302, a signal-dependent gain amplifier (SDGA) 304-1, analog-to-digital converter (ADC) 308, and output data building (ODB) circuit 310. SDGA 304-1 also generally comprises a programmable gain amplifier (PGA) 306 and a gain-setting circuit (GDC) 304-1.

In operation, the circuit receives signals NS and S from a CMOS sensor, such as CMOS sensor 100, and generates a digital signal DS. CDS circuit 302 receives each of signals N and NS and calculates the difference between them, which corresponds to analog signal S. This analog signal S is received by the SDGA 304-1. GDC 304-1 generally performs region segmentation or generates codes corresponding to the intensity of the analog signal S. This region segmentation generates a gain signal (which corresponds to relative intensity and which is different for each of the different regions) and a high-order digital signal UB. Based on the gain determined the GDC 304-1 due to the relative intensity of the analog signal S, the PGA 306 amplifies the analog signal so that the output PGA 306 varies depending on the segmentation interval or segmentation region. This amplified signal is provided to ADC 308 that generates a low-order bit signal LB. These digital signals UB and LB are then combined by the ODB circuit to generate a digital signal DS.

In FIG. 3, the difference calculation is performed by the CDS circuit 302 prior to amplification of signal S. This is generally required when signal N and signal NS are large (typically 1-3V). However, signal S obtained by difference calculation with the CDS circuit 302 can be very small (one the order of about several hundred μV) when a dark location is imaged. Therefore, in order to prevent the amplifier from saturating the difference calculation by the CDS circuit 302 is preferably performed prior to amplification.

An important aspect of the operation of circuit 300-1 is application of the relative gain applied to signal S. The analog signal S is preferably divided into regions represented by powers of 2 (for example, into 4 regions) by GDC 304-1. For example, when the voltage range of signal S is 0V to 0.9V, it can be segmented into the following four regions: 0V to 0.025V for the first region; 0.025V to 0.1V for the second region; 0.1V to 0.4V for the third region, and 0.4 to 0.9V for the fourth region. When it is divided into regions represented by powers of 2, the number of bits (when high-order bit digital signals that correspond to each of the segmented regions are generated) can be correlated to the number of bits of the exponent. For example, using the four regions described above, the output to ODB circuit 310 is 00, 01, 10 and 11 for the four regions, respectively. Signal S can then be amplified with greater gain for regions in which the intensity of signal S is lower and with less gain for regions in which the signal intensity is higher. This has the advantage that the amplified analog signal can be digitized by comparison with a common ramp signal, and that the fall range of the analog signals that can be digitized can be used in each of the divided regions. For example, using the four regions described above, a different gain is set for each segmented region as follows: 64 for the first region; 16 for the second region; 4 for the third region; and 2 for the fourth region. Accordingly, in this example, the range of the signal output from PGA 306 is as follows: 0V to 1.6V in the first region; 0.4V to 1.6V in the second region; 0.4 to 1.6 V in the third region; and 0.8 to 1.8 V in the fourth region.

Turning to FIG. 4, a graph showing signal S (indicated by A) can be seen. Additionally, the outputs for each of the first to the fourth regions (having gains of 64, 16, 4, and 2, respectively) can be seen (as indicated by B through E, respectively). In a region in which the light intensity is low (such as the first region), the amplified output will be significantly higher than were it not amplified. This indicates that electronic noise components contributed after amplification can be ignored.

FIGS. 5A and 5B show a circuit 300-2, which is an example of feedforward arrangement of circuit 300-1 of FIG. 3. In the configuration, signal S is provided from CDS circuit 302 to GDC 308-2 in SDGA 304-2. Signal S is applied to each comparator 314-1 to 314-N, where each compares the signal S to its corresponding threshold voltage TH1 through THN. These threshold voltages TH1 through THN are generally used for segmenting regions and to set individual gains. For example, if there is segmentation into three regions, 3 comparators are normally employed. The outputs from the comparators 314-1 to 314-N are generally applied region setting circuit (RC) 316, which generates digital signal UD and the gains.

Figure 6B:
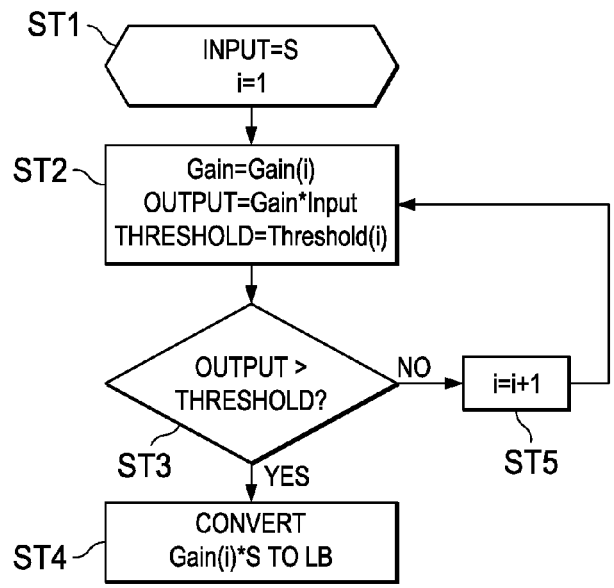

Tuning now to FIGS. 6A and 6B, circuit 300-3, which is an example of a feedback arrangement of circuit 300-1, can be seen. Here, the gain is dynamically increased until a threshold is reached. Initially, as shown in step ST1, signal S is input into PGA 306, and the iteration (i) is set to 1. In step ST2, the gain and threshold are set based on the iteration (i) and the output is calculated. In step ST3, if the output is greater than a threshold, the iteration (i) is increased and step ST2 is repeated. If the output is less than the threshold in step ST3, then the output is converted into a digital signal LB.

Although the feedback system described above is more complicated than the feedforward system, it has certain advantages. For example, (1) The signal to be compared is sufficiently amplified, so that the non-ideal effects of the comparator are negligible; (2) Comparison and amplification can be performed simultaneously; and (3) For these reasons, a lower-speed comparator and amplifier can be used, and the cost can be reduced in terms of occupied surface area and the power consumed by the circuitry.

Referring to FIGS. 7A through 7D of the drawing, the reference numeral 400 generally designates processing circuitry 400 in accordance with a preferred embodiment of the present invention. Circuit 400 is similar to circuits 300-1 through 300-3 in that each receives signals N and NS from a CMOS sensor (such as CMOS sensor 100). Some differences, however, are that the CDS circuit and SDGA (which are each shown in circuits 300-1 through 300-3) are combined in stage 402. Stage 402 generally comprises buffers 406 and 408, integrator 410, comparator 414, and estimation stopping and coding circuit (SIC) 416.

In operation, signals N and NS are converted into digital signal DS. Signals N and NS are input to integrator 410 through buffer 406 and 408, and the difference or signal S is calculated. Signal S is then amplified with a predetermined gain and provided to comparator 414, wherein it is compared with threshold voltage or value VTH. If the output of integrator 410 does not exceed the threshold value VTH, the result is input to SIC 416, and an estimate is calculated to amplify the difference with a higher gain than the previous time, and the process is repeated until the output of integrator 410 exceeds the threshold value VTH. If, on the other hand, the output of integrator 410 exceeds the threshold value VTH, the result is input to SIC 416 and further estimated amplification is stopped. The estimated amplified signal (Gain*S) is input to ADC 404, and a high-order bit digital signal UB corresponding to each of the segmented regions at that time is generated. Signals UB and LB are then output to ODB circuit 312 and converter into digital signal DS.

Figure 7A:
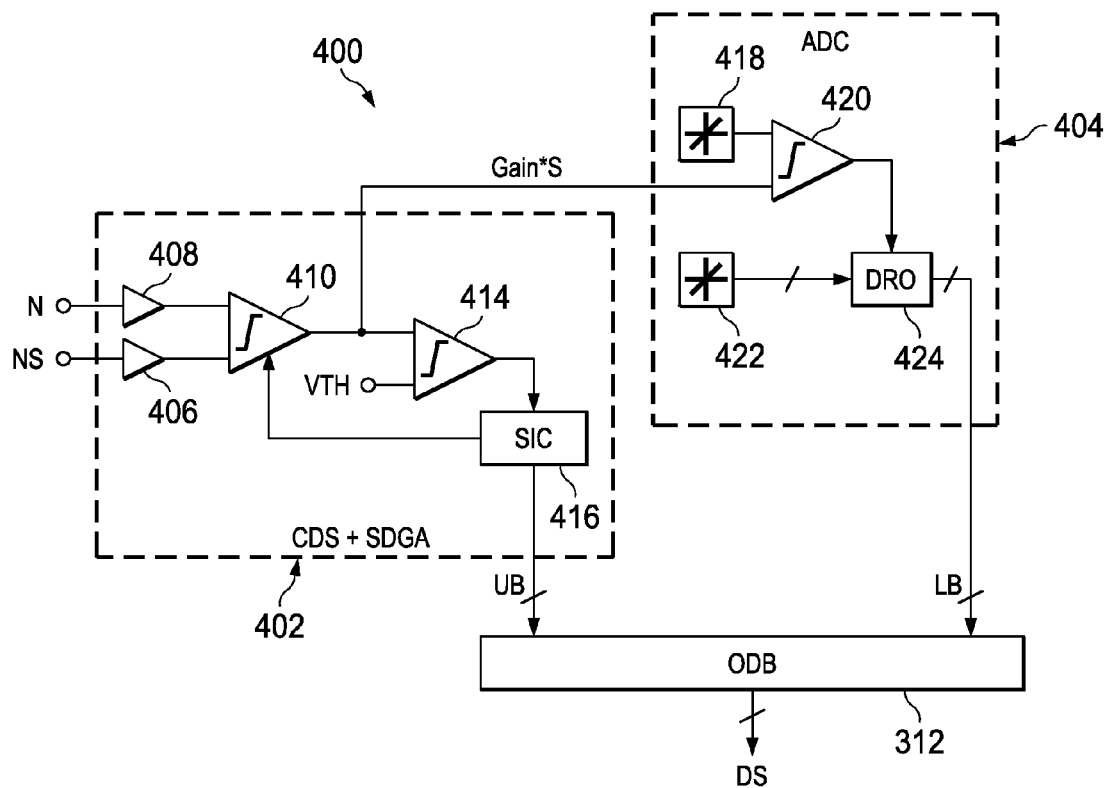
FIG. 7A through 7D are an example of processing circuitry for the CMOS sensor of FIG. 1 in accordance with a preferred embodiment of the present invention.
Figure 7B:
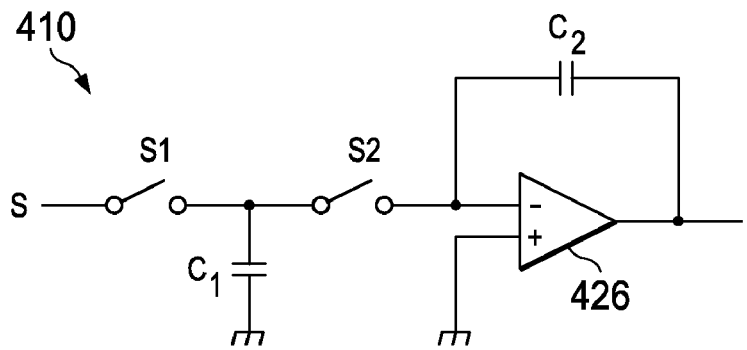
Figure 7C:
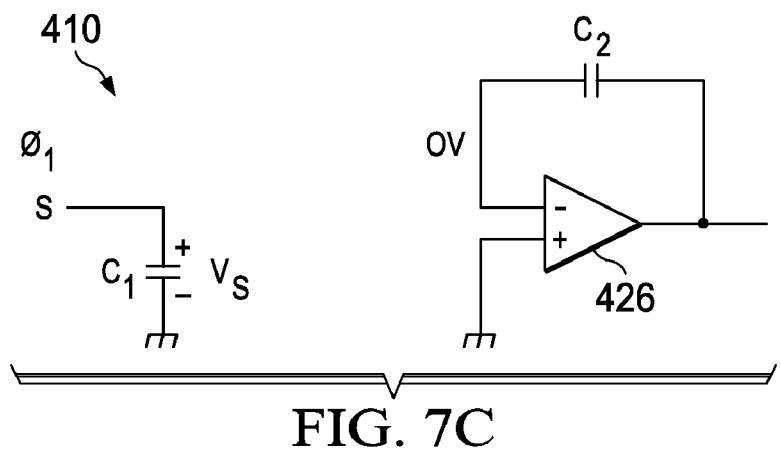
Figure 7D:
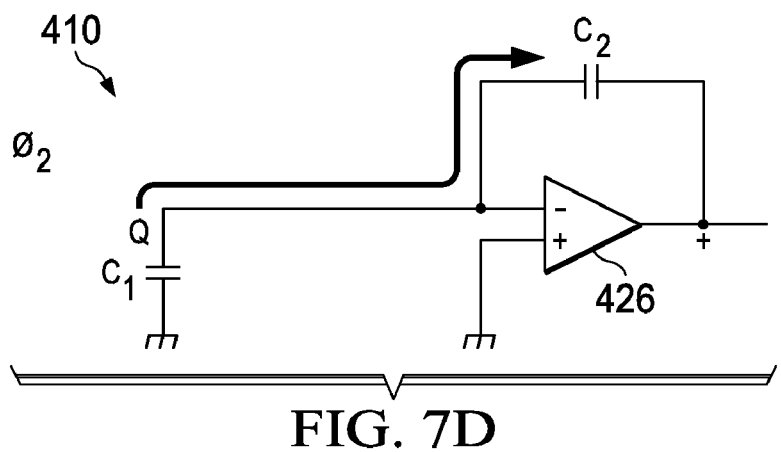

Looking to FIGS. 7B through 7D, the operation of integrator 410 is shown. Integrator 410 (as shown in FIG. 7B) is generally comprised of switches S1 and S2, capacitors C1 and C2, and differential amplifier 426. During a first phase φ1 (as shown in FIG. 7C) switch S1 is closed, while switch S2 is open, so that signals S can charge capacitor C1 to voltage VS and so that 0V is fed back to differential amplifier 426. During the second phase φ2 (as shown in FIG. 7D), switch S2 is closed, while switch S1 is open, so that the charge in capacitor C1 (which corresponds to signal S) is transferred to capacitor C2, and the output of differential amplifier 426 becomes voltage VS. When the drive cycles in the first phase φ1 and second phase φ2 are repeated, output of differential amplifier 426 is estimated and amplified by the number of repetitions is obtained so as to generate the amplified signal.

Once the output of integrator 410 is estimated, ADC 404 can process this output. In particular, this output is provided to comparator 420 and compared with analog signal generated by circuit 418. Low-order bit digital signal LB is generated by digital register (DRG) 424 based on the output of comparator 420 and digital ramp signal generated by digital ramp signal generator 422. Additionally, the power consumed by the comparator 420 is proportional to the speed of comparison, and a comparator that resolves one differential input per cycle consumes a corresponding amount of power. However, in this configuration, there is only one fixed comparison ramp. Therefore, the waveform seen in the comparator 420 normally has no constant relationship to the input signal. A difference is that the time at which the comparator 420 stops. Due to this characteristic, one cycle or more may be necessary for the comparator 420 to analyze the input, and the power consumption can be reduced. Moreover, because the comparator 420 uses an open loop, the bandwidth is small, as is the noise contribution, and because the noise is added to the amplified signal, the noise returned to the input can be removed with the gain applied. This makes it possible to ignore comparator noise more than other noise sources, including faster-stage signal paths. Non-ideal effects that generate artifacts in the digitized image can be offset, but imbalances in the timing response between comparators for different stages occur. However, they generate a fixed offset error that can be cancelled in the digital domain.

Figure 8:
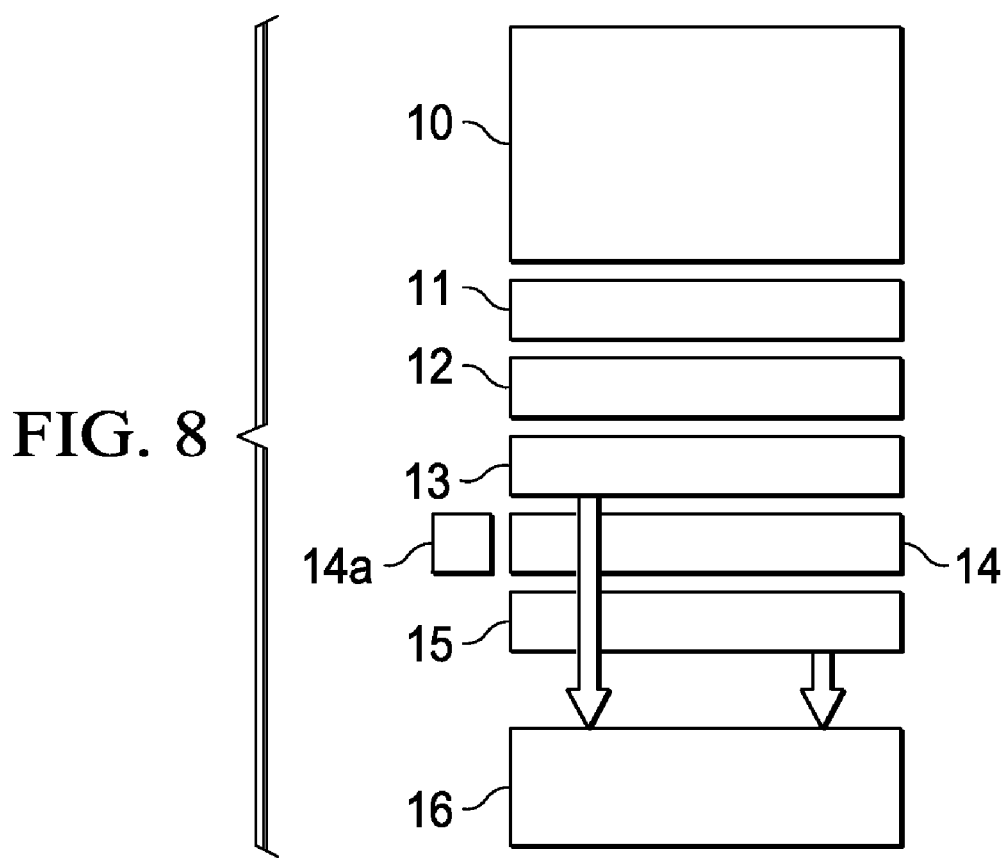
FIG. 8 is a layout diagram of an example of an image sensor using a circuit block in accordance with a preferred embodiment of the present invention.
Figure 9:
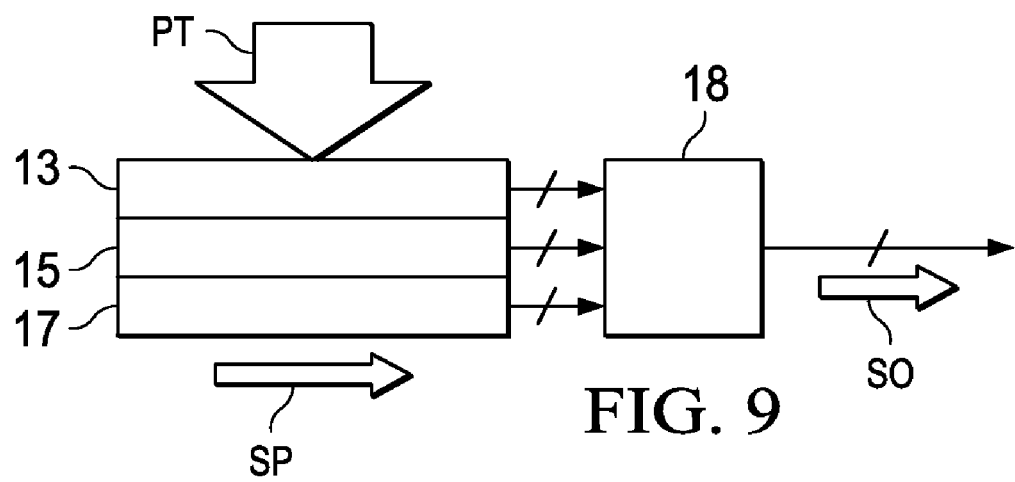
FIG. 9 is a circuit block diagram of a digital block in accordance with a preferred embodiment of the present invention.

FIG. 8 is a layout diagram of an example of an image sensor using a circuit block.

Sensor circuit 10 is composed of a line memory circuit 11, a gain-setting circuit 12, a gain register circuit 13, an ADC circuit 14, an ADC register circuit 15, and a digital compensation and serialization circuit 16.

Sensor circuit 10 generally comprises CMOS sensor pixels arranged in the form of an array.

Line memory circuit 11 is a memory that temporarily stores signal N, the output signal from the pixels, and signal NS, for each column of pixels, and is provided for each column of pixels.

Gain-setting circuit 12 is gain-setting coding circuit GDC in the embodiment described above, and is provided for each column of pixels.

Gain register circuit 13 is a register that holds the high-order bit digital signal coded by gain-setting coding circuit GDC and is provided for each column of pixels.

ADC circuit 14 is a circuit that A/D converts signal S amplified with the set gain and is provided for each column of pixels.

A ramp signal generation circuit 14a that generates the ramp signal used by the ADC is provided in an area adjacent to ADC circuit 14.

ADC register circuit 15 is a register that holds the low-order bit digital signal generated by ADC circuit 14 and is provided for each column of pixels.

Digital compensation and serialization circuit 16 generates the entire digital signal from the high-order bit digital signals and the low-order bit digital signals, and performs digital compensation and serialization.

The foregoing will be explained for a digital block that has the gain register circuit and ADC.

FIG. 12 is a circuit block diagram for the digital block. Gain register circuit 13 has an A/D conversion circuit 15, an FPN memory 17, and an ALU/serialization circuit 18.

The digital block generally comprises several shift registers, memories and ALUs.

An ALU is a very simple circuit, and only need be capable of addition, subtraction and shift operations.

The high-order bit digital signal coded by the gain-setting circuit is transferred to gain register circuit 13 and the low-order bit digital signal converted by the ADC circuit is transferred to ADC register circuit 15 by parallel transfer PT from the pixels in the sensor circuit for each row of pixels.

The FPN memory stores data required to correct FPN. The memory is replenished with data by the ALU at the correction stage.

After the high-order bit digital signal and the low-order bit digital signal are transferred by parallel transfer PT for each row of pixels to gain register circuit 13 and ADC register circuit 15, respectively, they are serialized in terms of row processing time. This circuit operates the same way as a pipeline A/D converter. Correction by data in the FPN memory is performed in the ALU during serialization processing.

Signal processing from gain register circuit 13, A/D conversion register circuit 15 and FPN memory 17 to ALU/serialization circuit 18 by serial processing (SP) is performed as described above, and serial output SO to the outside is output from ALU/serialization circuit 18.

The block diagram in FIG. 12 shows a preferred embodiment of the present invention in which serialization is not necessarily required. Parallel signal processing is also possible, and the degree of parallelization can be in a range from one block for all columns to block processing per column. An intermediate configuration in which several columns are processed is also possible, and the number of serialized blocks can be reduced.

In the selection choices, the optimal configuration in each case is determined by the combination of the specific processing and the data processing speed.

Correction processing is performed as described below, for example. During correction processing, several dark pixel rows are read, and the ALU block calculates data to be stored in the FPN memory. This operation is performed once for each frame, for example.

FPN correction and serialization are performed as described below, for example.

FPN is calculated, and after being stored in the FPN memory, an initial signal corresponding to an illuminated pixel is transferred to the digital block for each row.

In this case, ALU processing removes (subtracts) FPN using data stored in the FPN memory. The data obtained by subtracting FPN is output to the outside of the system. After the final row is serialized, data processing of the next frame is started immediately.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An apparatus comprising:
    a plurality of pixel elements arranged into an array;
    interface circuitry that is coupled to each of the pixel elements;
    an input stage including:
        a plurality of buffers that are each coupled to the interface circuitry;
        an integrator that is coupled to each of the buffers, wherein the integrator outputs has an adjustable gain, and wherein the integrator includes:
            a first switch;
            a first capacitor that is coupled between the first switch and ground;
            a second switch that is coupled to the first capacitor;
            a differential amplifier having a first input terminal, a second input terminal, and an output terminal, wherein the first input terminal is coupled to ground, and wherein the second input terminal is coupled to the second switch; and
            a second capacitor that is coupled between the output terminal and the second input terminal;
        a comparator that is coupled to the integrator and that compares the analog signal to a threshold voltage; and
        a coding circuit that is coupled to the comparator and the integrator and that generates a first digital signal, wherein the coding circuit increases the adjustable gain until the analog signal is greater than the threshold voltage;
    an analog-to-digital converter (ADC) that is coupled to the integrator so as to generate a second digital signal; and
    an output circuit that is coupled to each of the coding circuit and the ADC so as to generate a third digital signal from the first and second digital signals.

2. The apparatus of claim 1, wherein the ADC further comprises:
    a second comparator that is coupled to the integrator;
    a digital ramp signal generator; and
    a digital register that is coupled to the second comparator, the digital ramp signal generator, and the output circuit.

3. An apparatus comprising:
    a plurality of pixel elements arranged into an array;
    interface circuitry that is coupled to each of the pixel elements;
    an input stage including:
        an integrator that is coupled to the interface circuitry, wherein the integrator outputs has an adjustable gain;
        a comparator that is coupled to the integrator and that compares the analog signal to a threshold voltage; and
        a coding circuit that is coupled to the comparator and the integrator and that generates a first digital signal, wherein the coding circuit increases the adjustable gain until the analog signal is greater than the threshold voltage;
    an ADC that is coupled to the integrator so as to generate a second digital signal, wherein the ADC includes:
        a second comparator that is coupled to the integrator;
        a digital ramp signal generator; and
        a digital register that is coupled to the second comparator, the digital ramp signal generator, and the output circuit; and
    an output circuit that is coupled to each of the coding circuit and the ADC so as to generate a third digital signal from the first and second digital signals.

4. The apparatus of claim 3, wherein the integrator further comprises:
    a first switch;
    a first capacitor that is coupled between the first switch and ground;
    a second switch that is coupled to the first capacitor;
    a differential amplifier having a first input terminal, a second input terminal, and an output terminal, wherein the first input terminal is coupled to ground, and wherein the second input terminal is coupled to the second switch; and
    a second capacitor that is coupled between the output terminal and the second input terminal.

5. The apparatus of claim 4, wherein the array has a plurality of columns, and wherein the interface circuitry further comprises a line memory circuit that is coupled to each column of the array.

6. The apparatus of claim 5, wherein the input stage further comprises a plurality of buffers, wherein each buffer is coupled between the interface circuitry and the integrator.

* * * * *